UNITED STATES PATENT OFFICE.

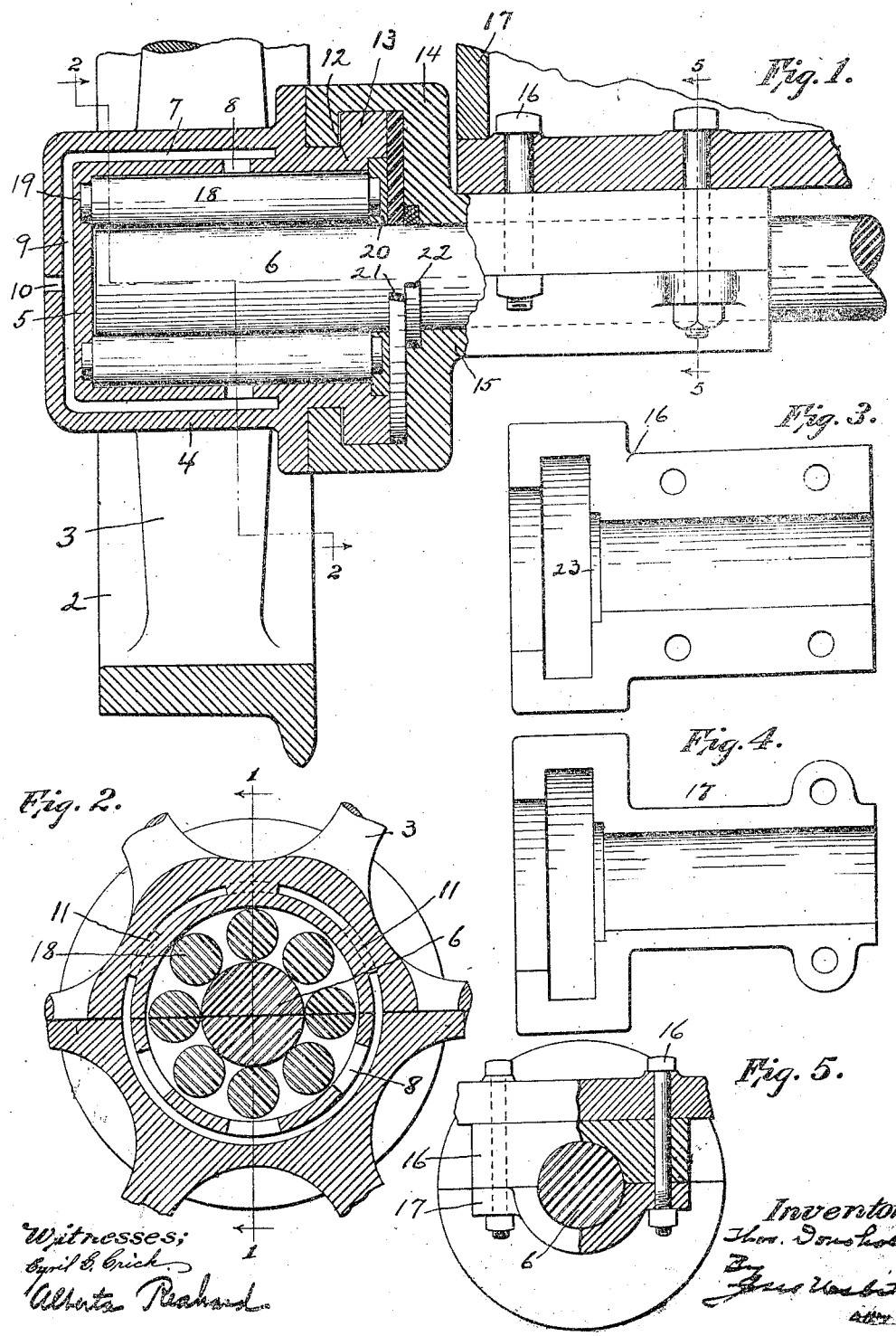

THOMAS DONOHOE, OF AVELLA, PENNSYLVANIA.

MINE-CAR WHEEL.

960,852.

Specification of Letters Patent. Patented June 7, 1910.

Application filed August 6, 1909. Serial No. 511,522.

*To all whom it may concern:*

Be it known that I, THOMAS DONOHOE, a resident of Avella, in the county of Washington and State of Pennsylvania, have invented certain new and useful Improvements in Mine-Car Wheels, of which the following is a specification.

The primary object of this invention is to provide an efficient roller bearing wheel for mine cars.

The invention is preferably embodied in a wheel of the cap type, i. e. a wheel having the outer end of its hub closed, and with the hub cast with a peripherally flanged extension at its inner end which is embraced and confined by members secured to the car body. It will be understood, however, that the invention may be embodied in wheels of various types and for various uses.

In the accompanying drawings, Figure 1 is a vertical longitudinal section, partly in elevation, of a wheel and bearing embodying the invention, the same being on line 1—1 of Fig. 2, and Fig. 2 is a section on the broken line 2—2 of Fig. 1. Figs. 3 and 4 are details of the wheel holding members secured to the car body. Fig. 5 is a cross-section on line 5—5 of Fig. 1.

Referring to the drawings, the rim 2 and spokes 3 of the wheel here shown are cast integral with hub 4. The hub is of the cap type, with its outer wall 5 inclosing the outer end of the hub cavity which receives axle 6. The hub is chambered at 7 to receive oil and pass it to the axle bearing through ports 8, the oil being admitted to chamber 7 through ducts 9 extending from the oil opening in the outer face of wall 5. Chamber 7 may be made continuous around the hub excepting for web portions 11.

A further feature of the present embodiment is the integral annular extension 12 of the inner end of the hub, the extension being flanged peripherally at 13, with said flanged extension embraced and confined by members 14 and 15 secured by bolts 16 to car body 17. 18 are the rollers carried by the hub for engaging axle 6. The outer end of the set of rollers bear in cavities 19 formed in the inner face of wall 5, and the inner end of the set have similar bearings in the ring-like plate 20 shrunk or otherwise secured in a depression in the end face of hub extension 12. A washer 21 at the extremity of the hub extension may be shrunk on the axle with a felt or other packing ring 22 adjacent the washer within an offset 23 in members 16 and 17.

The entire wheel, excepting rollers 18 and bearing plate 20, is a single casting, and with the rollers and said plate inserted the wheel is ready for service.

I claim:—

1. A car wheel having an axle-receiving hub formed to inclose the outer end of the hub cavity and at said end provided with bearings for one end of a set of rollers, a member carried by the hub at the opposite end of the hub cavity to provide bearings for the other end of the set of rollers, and rollers mounted in said bearings.

2. A car wheel having an axle-receiving hub formed to inclose the outer end of the hub cavity and at said end provided with bearings for one end of a set of rollers, a peripheral flange at the opposite end of the hub, a member applied to said flanged end to provide bearings for the other end of the set of rollers, rollers mounted in said bearings, and wheel holding means secured to the car and embracing the hub flange.

3. A car wheel having an axle-receiving hub with the hub cavity closed at its outer end, the wall of the cavity constituting the closed end formed with bearings for one end of a set of rollers, an inserted member at the opposite end of the hub cavity formed with bearings for the other end of the set of rollers, and rollers mounted in said bearings.

4. A car wheel having an axle-receiving hub with the outer end of the hub cavity closed by a wall forming an integral portion thereof with cavities in said wall forming bearings for one end of a set of rollers, the opposite end of the hub formed with a depression, a member received in said depression and formed with bearing cavities for the opposite end of the set of rollers, and rollers mounted in said bearings.

5. A car wheel having an axle-receiving hub formed to inclose the outer end of the hub cavity and at said end having bearings for one end of a set of rollers, a peripherally flanged extension at the opposite end of the hub, the end face of said extension formed with a depression, a member fitted in said depression and having bearings for the opposite end of the set of rollers, rollers mounted in said bearings, and wheel holding means secured to the car and embracing the flanged hub extension.

In testimony whereof I affix my signature in presence of two witnesses.

THOMAS DONOHOE.

Witnesses:
A. M. GARDNER,
DANIEL J. McGARRY.